United States Patent [19]

Geets

[11] Patent Number: 4,728,481
[45] Date of Patent: Mar. 1, 1988

[54] FULL RANGE NUCLEAR POWER PLANT STEAM GENERATOR LEVEL CONTROL SYSTEM

[75] Inventor: Jacques M. Geets, Delmont, Pa.
[73] Assignee: Westinghouse Electric Corp., Pittsburgh, Pa.
[21] Appl. No.: 932,245
[22] Filed: Nov. 19, 1986
[51] Int. Cl.$^4$ .............................................. G21C 7/36
[52] U.S. Cl. .................... 376/216; 376/211; 364/431.01
[58] Field of Search ............. 376/210, 211, 244, 216, 376/215; 60/644.1, 646, 656, 665, 667; 364/431.01

[56] References Cited

U.S. PATENT DOCUMENTS

| | | | |
|---|---|---|---|
| 4,290,850 | 9/1981 | Omori | 376/210 |
| 4,440,715 | 4/1984 | Sato | 376/211 |
| 4,478,783 | 10/1984 | Broadwater | 376/211 |
| 4,651,530 | 3/1987 | Omori | 376/246 |

Primary Examiner—Donald P. Walsh
Attorney, Agent, or Firm—D. C. Abeles

[57] ABSTRACT

A full range steam generator level control system and method is provided by a weighted linear combination of a pair of inputs from a low power and a high power controller to actuate feedwater regulation valves.

17 Claims, 4 Drawing Figures

//www.w3.org/1999/xhtml">
FULL RANGE NUCLEAR POWER PLANT STEAM GENERATOR LEVEL CONTROL SYSTEM

BACKGROUND OF THE INVENTION

This invention relates generally to steam generators used in pressurized water reactor (PWR) nuclear power plants, and more particularly to a system and method of controlling steam generator level throughout the entire range of reactor load without the need of a manual or automatic transfer between a low power controller and a high power controller. As used herein, the term "steam generator level" refers to the level of secondary loop feedwater contained in the steam generator.

The primary function of a process controller, of course, is to maintain one or more process variables at or near desirable set points. However, since the human operator is responsible for the performance of the process, some means must be provided to enable him to verify that the controller is doing its job and to enable him to take over the control of the process if necessary. A control station provides this link between the operator and the process.

There are five typical parts to every control station: (1) a process-variable indicator, (2) a set-point adjusting mechanism, (3) an adjustment device (usually called manual) that directly manipulates the signal to the control valve (4) an output signal indicator, and (5) a device for switching between automatic mode and manual mode control. The implementation of the five control-station essentials will vary among manufacturers, but they usually are present in any control loop whether it be pneumatic, electronic, or computerized.

Process-variable indicators appear in many forms. In large-case instruments, the indicator may be a pointer on a circular or a horizontal scale, and may be part of a controller, a recorder, or both. Current configurations, in general, separate recorders and controllers such that the control stations are joined with the controllers to become indicating controllers. For each configuration of recorder or indicator, there is a different way to manipulate the set-point. In pneumatic instruments, the set-point mechanism generally adjusts a small transmitter which supplies a three to 15 pounds per square inch signal to the controller. Electronic instruments on the other hand generally provide a means for adjustment which consists of a potentiometer generating a voltage of opposite polarity to the process-variable signal.

The adjustment device is usually a manually operated device which directly manipulates the output signal to the valve or valve actuator. It is used only when the automatic controller is not in service. Most manual outputs are directly proportional to the position of the adjusting device. However, in some of the newer controllers, manual adjustments change the output by actuating an "increase" or "decrease" mechanism. An output signal indicator is a device which indicates what signal level is being applied to the control valve. The types of indicators used for such purposes are similar to those used for process-variable indicators. Normally, such indicators will have the ends of the scale labeled as "open" or "closed," referring to the position of the control valve.

The purpose of the auto-manual, or bumpless transfer switch is to change the source of the signal to the valve. To do this without changing the signal size, that is, with bumpless transfer, older controllers require a balance procedure. When switching from the normal or automatic mode to manual, the transfer device is first moved to an intermediate or balanced position and the manual output is matched with the automatic controller output. The transfer lever is then moved to the manual position to complete the bumpless transfer, with the output being adjusted to the desired value. When going from manual to automatic, the balanced position is used to match the set-point with the process variable before switching to automatic. Then the set-point is adjusted to the desired value.

In currently available process-control stations, the balanced position is being removed, each manufacturer generally using a different scheme. The most common method is to force the manual-adjust output to track the controller output while in automatic mode and to make the set-point-adjustment output track the measurement while in manual. Thus when switching, no balancing or alignment is necessary.

The control of feedwater level in the secondary loop of a nuclear steam supply system, however, is exemplary of situations where control is difficult because the system behaves with non-minimum phase dynamics. Non-minimum dynamics is a term used to describe a property of the frequency domain transfer function between plant input function and plant output function. Transport lags or pure-time delay between an input signal and its corresponding output is one form of non-minimum phase behavior. Another form of non-minimum phase behavior is an initial negative response of an output signal before changing sign and approaching its positive asymptote. This type of non-minimum phase behavior or what is often called by operators of such nuclear steam supply systems "shrink/swell behavior," is usually associated with plants with transfer functions containing right half plane zeros.

Changes in reactor power, steam flow, feedwater temperature and feedwater flow all affect the measured level of secondary loop feedwater contained in the steam generator. The level controller's basic task is, therefore, to maintain level on target and within limits by changing feedwater flow to compensate for changes in level produced by the other factors. The main consequence of the long lags and shrink and swell effects is that a controller must anticipate the affects of changes in plant state or control actions on steam generator level, and make compensatory responses before the ultimate effect of the event on steam generator level is manifested in measured level. In addition, the controller must keep track of past control actions and changes in plant state in order to interpret current steam generator level behavior. As a result, the process cannot be controlled easily by simple feedback of the error level. If the feedwater controller waits for an effect to be manifested in terms of level error before taking compensatory actions, the system can become unstable. This is because, given the long lags in the system, responses made after a disturbance in level is seen are not likely to produce an effect on level in time to avoid crossing a limit. Shrink and swell effects complicate the situation further. Because of such effects, the control action that ultimately brings the system back into balance initially exacerbates the problem. For example, if the operator waits until he sees the level decreasing before adding water, the water he adds will initially cause further decrease in level due to shrink, making a limit crossing more likely.

In addition to the difficulties associated with the complex process dynamics, prediction is difficult because the controller often does not have direct access to the critical state variables such as the steam generator water mass inventory, but only relies on indirect measures, such as turbine power, steam flow, and steam generator level. Furthermore, most critically accurate measures of steam flow and feedwater flow are not available at low power. As a result, the controller has no direct way of knowing whether steam flow and feedwater flow are in balance or how much of a change in feedwater flow is required to bring them into balance. The operators instead are forced to rely almost exclusively on level trend data to infer such information. Because of the long lags and shrink and swell effects discussed herein above, there is a significant delay before information about the feedwater flow-steam flow balance is manifested in steam generator level behavior.

Conventional three-element controllers used to measure steam generator level, steam flow, and flow in PWR nuclear power plants are, accordingly, not effective at very low power levels two reasons: (1) the lack of accurate flow measurements, and (2) the change in steam generator transfer function occurring at low feedwater temperatures. As a result, in existing designs the steam generator level control is transferred either to manual control or to a different controller for operation in the low power range. It is imperative in both cases that the transfer be "bumpless" if a reactor trip on high/low steam generator level is to be avoided.

SUMMARY OF THE INVENTION

Accordingly, it is a general object of the present invention to provide a full range steam generator level control system.

More particularly, it is an object of the present invention to provide a smooth transition from control of the steam generator level by a low power controller to a high power controller, or vice versa.

It is another object of the present invention to eliminate the necessity for manual or automatic transfer between low and high power level controllers for a steam generator in PWR nuclear power plants.

It is yet another object of the present invention to provide a simplified design for a full range steam generator level control system by eliminating bumpless transfer circuits, while at the same time reducing the probability of reactor trips over the full power range.

Briefly, these and other objects of the present invention are accomplished by a system and method which combines the outputs from a conventional low power controller and a conventional high power controller, and according to the input feedwater temperature, produces a weighted linear combination of those outputs to actuate regulating feedwater valves associated with the steam generator.

These and other objects of the present invention will become apparent from the following detailed description of the preferred embodiment when considered in conjunction with the accompanying drawings wherein:

DETAILED DESCRIPTION OF THE INVENTION

Figure 1:
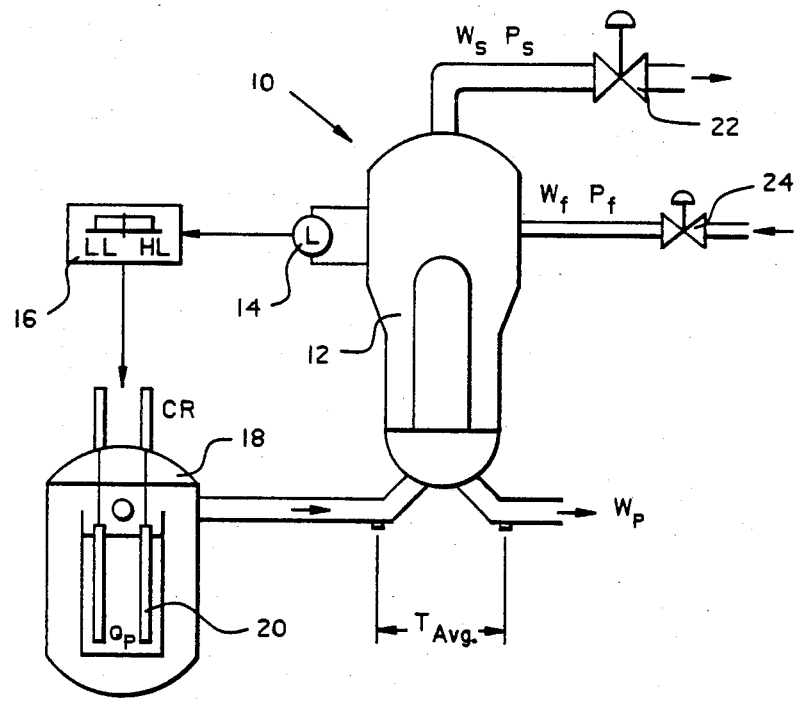
FIG. 1 is a functional diagram of the processes that affect indicated level in a steam generator of a nuclear steam supply system.

Referring now to the drawings, wherein like characters designate like or corresponding parts throughout the several views, there is shown in FIG. 1 a functional diagram of the processes that affect indicated level in a steam generator 12 of a nuclear steam supply system 10. The level (i.e., the level of secondary loop feedwater contained in the steam generator 12) in the steam generator 12, a critical performance variable, is indicated by a level indicator 14 connected between the steam generator 12 and a trip circuit 16 adapted to trip a reactor 18 by lowering control rods 20 situated therein upon the occurrence of the indicated level in the steam generator 12 reaching a low level trip-point or a high level trip-point. Functional control actions are provided by the positioning of a steam flow control valve 22, a feedwater flow control valve 24, and by controlling the feedwater pump speed in case of variable speed feedwater pumps. Process variables, as indicated, include steam flow $W_s$, feedwater flow $W_f$, steam pressure $P_s$, and steam generator level L.

Various other considerations affect the operation of the nuclear steam supply system 10. For example, direct control action may be provided through positioning of steam dump valves, turbine governor valves, feedwater pump speed control, main turbine speed control, auxiliary, bypass and main feedwater regulation valves, or the control rods 20. Secondary variables which must be taken into consideration include the position of the steam dump valve, turbine speed, turbine speed change, feed pump speed, pressures in the main steam and feedwater headers, and feedwater control valve positions.

Figure 2:
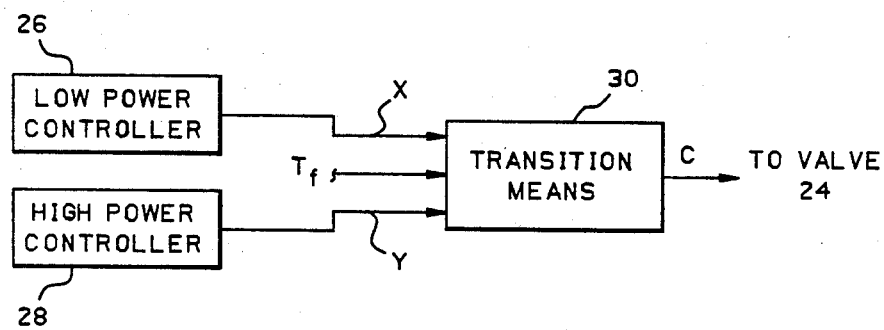
FIG. 2 is a generalized block diagram of the present invention incorporated with the nuclear steam supply system of FIG. 1 to control the level of its steam generator.

Since, at low feedwater temperature, there is a change in the steam generator function, and since accurate flow measurements are unavailable at very low reactor power levels, conventional nuclear steam supply systems such as those shown in FIG. 1 utilize a low power controller 26 in addition to a high power controller 28 (FIG. 2). However, in accordance with one important aspect of the invention as illustrated in FIG. 2, respective outputs from the low power controller 26 and high power controller 28 are input to a transition means 30 which provides a smooth transition between the high power controller, 28 and low power controller 26 over the full power range of the reactor 18. The outputs X and Y, respectively from the low power controller 26 and high power controller 28, are fed to the transition means 30 in order to provide a weighted linear combination C to actuate the regulating feedwater valve 24 as a function of the feedwater temperature $T_f$. That combination C is derived from the equation:

$$C = A(T_f)x + B(T_f)y$$

where:

$$A(T_f) = (T_2 - T_f)/(T_2 - T_1)$$

$$B(T_f) = (T_f - T_1)/(T_2 - T_1)$$

X is the output of the low power controller
Y is the output of the high power controller
$T_f$ is the measured feedwater temperature
Functions $A(T_f)$ and $B(T_f)$ are both high and low limited to satisfy the conditions below:

$$0 \leq A(T_f) \leq 1$$

$$0 \leq B(T_f) \leq 1$$

As used in the above equation, $T_1$ and $T_2$ are set-points based upon characteristics of the feedwater temperature. Typically, $T_1$ is equivalent to 100° F., while $T_2$ is equivalent to 280° F.

Figure 3:
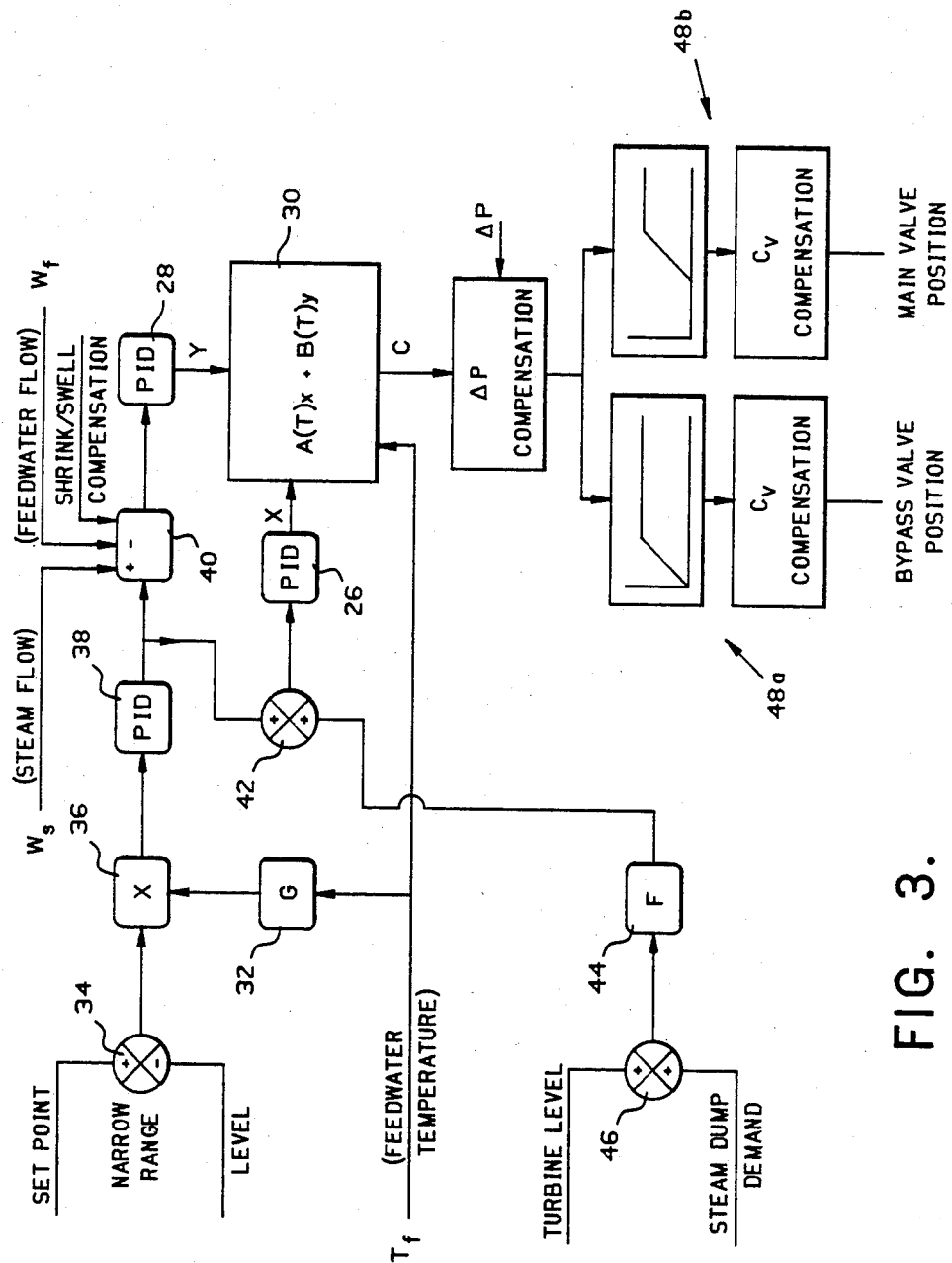
FIG. 3 illustrates the use of the present invention for a plant with a low power controller acting on narrow level measurement and estimated steam flow.

Referring now to FIG. 3, there is shown one embodiment of the present invention utilized in a nuclear power plant with a low power controller acting on narrow level measurement and estimated steam flow. As is conventional, "narrow range" refers to those situations when a predetermined portion of the steam generator (e.g., 12 feet) is used for control purposes. The transition means 30 is shown receiving a feedwater temperature input signal $T_f$, as well as inputs X and Y indicative of the outputs from the low power controller 26 and high power controller 28. The feedwater temperature signal $T_f$ is then provided with gain at block 32, and multiplied together with the resultant signal derived from a summing junction 34 receiving a negative input indicative of the steam generator level and a positive input representing the narrow range steam generator level set-point, at multiplier block 36. The output from 36 is then fed to a first three-mode or proportional-integral-derivative (PID) controller 38.

As is known, three-mode controllers combine the action of a proportional, integral, and derivative element into a signal unit. The major effect of these various elements is as follows. The proportional (gain) mode generally shapes the response curve, with higher gains generally giving a faster transient but more oscillatory responses. On the other hand, the integral (reset) mode eliminates steady-state offset, while the derivative (rate) mode allows higher proportional gains for high-ordered systems. The output from the first PID 38 is then fed both to a block 40 receiving a positive input of steam flow $W_s$, a negative input of feedwater flow $W_f$, as well as an input indicative of shrink/swell compensation, and to a second summing junction 42 for combination with a function generated by a function generator 44 receiving an input from a third summing junction 46 having a positive turbine level input and a positive steam dump demand input. The outputs from the block 40 and the summing junction 42 are respectively fed to the high power controller 28 and low power controller 26 for derivation of the X and Y inputs to the transition means 30. Thereafter, the transition means 30 operates upon the algorithm described herein above with reference to FIG. 2, and provides an output using a feed forward technique to valve linearization circuits 48a and 48b which compensate for valve characteristics and a differential pressure input for the main and bypass feedwater flow valves.

Figure 4:
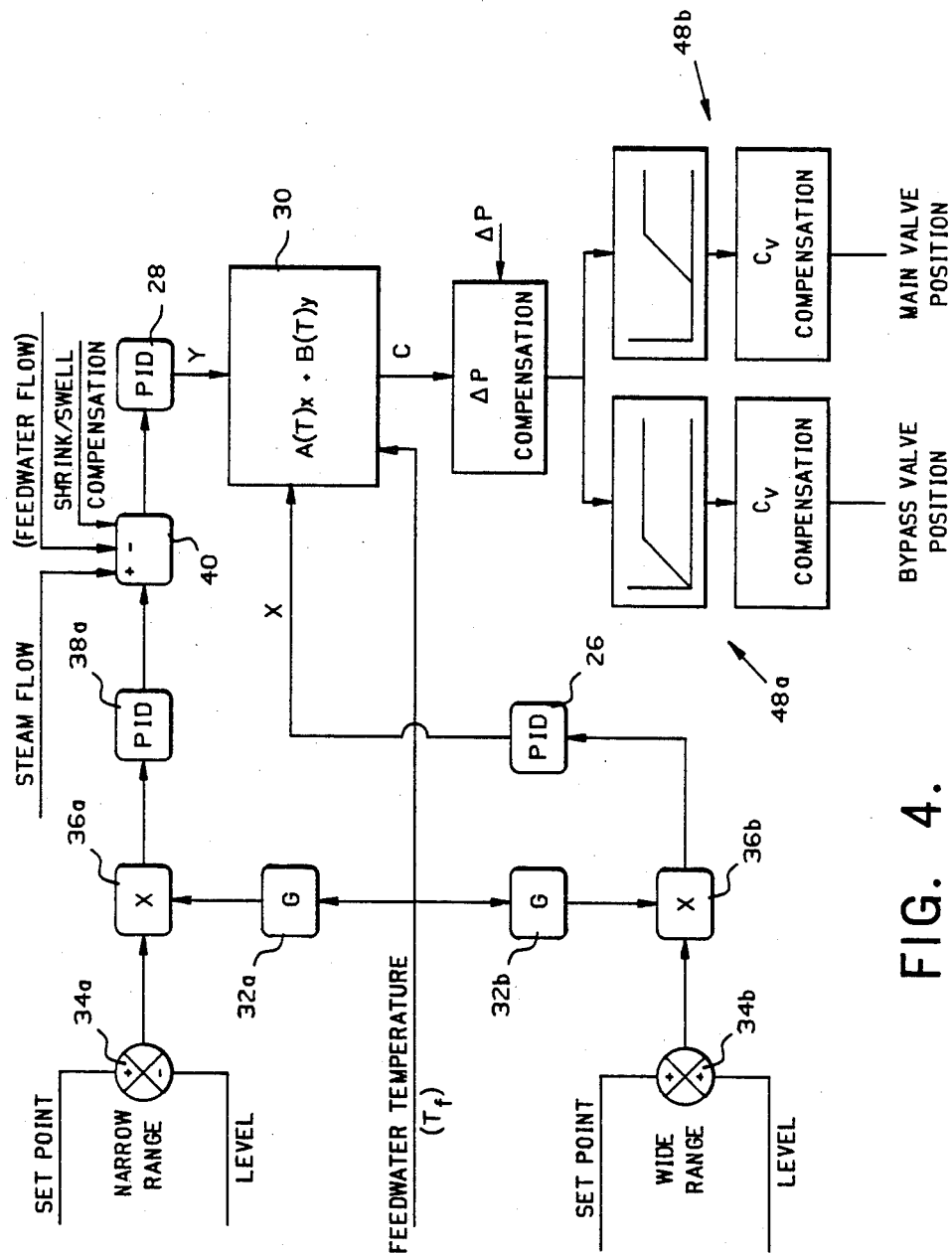
FIG. 4 illustrates the use of the present invention within a plant with a low power controller acting on wide range level measurement.

In some applications where steam generator level control is not critical, the output of the transition means 30 could be fed directly to the feedwater valve positioner. The output of the transition means 30 is a flow demand signal and if this signal is fed directly to the valve positioner, two undesirable effects will take place. First, since the feedwater valve characteristic (Cv versus valve position) is not perfectly linear, this valve non-linearity will introduce a variable gain in the control loop, hence the loop gain will depend on the operating point. This effect can be compensated by introducing a non-linear gain in the control loop as shown by the "Cv Compensation" blocks in FIGS. 3 and 4. Second, when the transition means 30 is calling for a constant flow and hence a fixed position of the feedwater control valve, the actual flow of feedwater delivered to the steam generator will still vary with any variation of the differential pressure existing across the feedwater control valve. This differential pressure may change because of changes in pressure drops in the feedwater system, because of feedwater pump speed changes, or change in the number of operating feedwater pumps. This effect can be eliminated by introducing a compensation signal as shown in FIGS. 3 and 4 by the block marked "ΔP Compensation". This block receives a signal proportional to measured pressure drop across the feedwater control valve and process it through a square root extractor. This assures that the delivered feedwater flow remains constant with changes in pressure drop across the feedwater control valve.

In a similar manner, and referring now to FIG. 4, the transition means 30 may be implemented for a plant with a low power controller acting on wide range level measurement. As is known, "wide range" refers to those situations which monitor the entire length of the steam generator 12. Such situations arise during the filling and start-up of the steam generator 12. Like the previous arrangement shown in FIG. 3, narrow range inputs of steam generator level and set-point are provided to a summing junction 34a to be multiplied with a gain-improved signal of feedwater temperature $T_f$ through block 32a and at multiplier block 36a. The feedwater temperature signal $T_f$ is also gain-amplified at block 32b for its multiplication and multiplier block 36b which receives an input from a summing junction 34b having wide range steam generator level and set-point inputs. The respective outputs from multiplier blocks 36a and 36b are thereafter fed to three-mode or PID controllers 38a and 26, with PID 26 providing the low power controller X input to the transition means 30 and PID controller 38a feeding the high power controller 28 through the summing box 40. The output of controller PID 28 is the high power controller Y input to the transition means 30. The remaining portion of FIG. 4 is similar in all respects to the corresponding portion explained with reference to FIG. 3.

It is, therefore, apparent that a full range steam generator level control system is provided by a transition means 30 described herein above with reference to FIGS. 2-4. At feedwater temperatures below $T_1$, the output from transition means 30 is identical to that of a conventional low power controller 26 while at temperatures above $T_2$, it is identical to that of the high power controller 28. In the transition range between $T_1$ and $T_2$, there is a gradual shift from low to high power controllers, thus allowing operation in the full power range without the need for a transfer mechanism. Not only does the elimination of a transfer process, either manual or automatic, between the low and high power controllers, as well as the elimination of associated bumpless transfer circuits provide a design simplification, but it also reduces the probability of reactor trips due to wildly fluctuating steam generator levels. Any existing system having a low power controller 26 and a high power controller 28 can be adapted with the transition means according to the present invention, and system tuning can be accomplished in a conventional way by setting A (T$_f$) equal to one, and B (T$_f$) equal to zero for tuning the low power controller 28, and A (T$_f$) equal to zero. B (T$_f$) equal to one for tuning the high power controller 28.

Obviously many modifications and variations of the present invention are readily apparent from the foregoing description. For instance, in the previous description, the feedwater temperature is used as a forcing function for the transition between the two controllers. However, since there is a strong correlation between the feedwater temperature and the feedwater flow in the power range of operation, it would be equally possible to use the feedwater flow signal as a forcing function to the transition means 30. It is therefore to be understood that within the scope of the appended claims, the present invention may be practiced otherwise than as specifically described.

I claim as my invention:

1. In a method of controlling feedwater level in a steam generator of a pressurized water reactor nuclear power plant, said steam generator having secondary loop feedwater lines, said method including the steps of outputting a first signal from a first three-mode controller to control feedwater flow through the secondary loop feedwater lines at reactor power levels below a predetermined percentage, and outputting a second signal from a second three-mode controller to control feedwater flow through the secondary loop feedwater lines at reactor power levels above the predetermined percentage, the improvement in combination therewith comprising:

receiving the first and second signals at a transition controller means;
   generating a first feedwater temperature-dependent function;
   operating on the first input signal with said first temperature-dependent function to produce a third signal;
   generating a second feedwater temperature-dependent function;
   operating on the second input signal with said second temperature-dependent function to produce a fourth signal; and
   adding said third and fourth signals resulting from said operating steps to control the feedwater flow through the secondary loop feedwater lines throughout an entire range of reactor load.

2. The improvement of claim 1, wherein said generating step for said first temperature-dependent function generates a function in the range from zero to one.

3. The improvement of claim 1, wherein said generating step for said second temperature-dependent function generates a function in the range of from zero to one.

4. The improvement of claim 1, wherein said generating step for the first temperature-dependent function comprises the steps of:
   setting an upper temperature limit for the feedwater contained in the feedwater lines;
   monitoring an instantaneous temperature of the feedwater in the feedwater lines;
   setting a lower temperature limit for the feedwater contained in the feedwater lines;
   periodically calculating the difference between said upper temperature limit and said instantaneous temperature; and
   outputting as the first temperature-dependent function a ratio of the result from said periodic calculations step and a differential temperature range defined by said upper and lower temperature limits.

5. The improvement according to claim 4, wherein said generating step for said second temperature-dependent function comprises the steps of:
   periodically calculating the difference between said instantaneous temperature and said lower temperature limit; and
   outputting as said second temperature-dependent function a ratio of said first and second periodic calculating steps.

6. A nuclear steam supply system, comprising:
   reactor means having a full range of power for generating a source of heat;
   secondary loop means including feedwater lines providing a source of water;
   steam generator means coupled to said reactor means and said secondary loop means for generating steam through the vaporization of said source of water by said source of heat; and
   control means for controlling the flow of water in said feedwater lines throughout the full range of said reactor means said control means comprising:
   first three-mode controller means for producing a first signal to control feedwater flow at reactor power levels below a predetermined percentage;
   second three-mode controller means for producing a second signal to control feedwater flow at reactor power levels above said predetermined percentage; and
   transition controller means receiving said first and second signals for transferring control of feedwater flow between said first and second three-mode controller means.

7. The system according to claim 6, wherein said reactor means comprises a pressurized water reactor.

8. The system according to claim 6, wherein said transition controller means comprises:
   first function generator means for generating a first feedwater temperature-dependent function;
   second function generator means for generating a second feedwater temperature-dependent function;
   first multiplication means connected to receive said first signal for multiplying said first signal for multiplying said first signal by said first function and producing a third signal indicative of the product;
   second multiplication means connected to receive said second signal for multiplying said second signal by said second function and producing a fourth signal indicative of the product; and
   adding means for producing a weighted linear combination of said first and second signals by adding said third and fourth signals.

9. The system according to claim 8, wherein said first function is in the range of from zero to one.

10. The system according to claim 8, wherein said second function is in the range of from zero to one.

11. The system according to claim 8, wherein said first function generator means comprises:
    means for setting an upper temperature limit for the feedwater contained in said feedwater lines;
    means for monitoring an instantaneous temperature of the feedwater in said feedwater lines;

means for setting a lower temperature limit for the feedwater contained in said feedwater lines;

first substracting means for periodically determining the difference between said upper temperature limit and said instantaneous temperature; and dividing means receiving said upper and lower temperature limits and the difference determined by said subtracting means for producing said first function by determining the ratio between said fifference and a differential temperature range defined by said upper and lower temperature limits.

12. The system according to claim 11, wherein said second function generator means comprises:

second subtracting means for periodically determining the difference between said instantaneous temperature and said lower temperature limit; and dividing means receiving the differences determined by said first and second subtracting means for producing said second function by determining a ratio therebetween.

13. The system according to claim 6, wherein said first and second three-mode controller means comprise proportional-integral-derivative controllers.

14. A control subsystem for a nuclear steam supply system, said nuclear steam supply system including a pressurized water reactor supplying a source of heat to a steam generator having a level of feedwater maintained by secondary loop feedwater lines, the flow through which is regulated by a feedwater regulating valve, said control subsystem comprising:

a low power controller outputting a first signal;

a high power controller outputting a second signal;

transition controller means receiving said first and second signals for producing a third signal indicative of a weighted linear combination of said first and second signals, said third signal being fed to the feedwater regulating valve for regulation of the feedwater flow through the secondary loop feedwater lines.

15. The subsystem according to claim 14, wherein said transition controller means comprises:

first functioning generator means for generating a first feedwater temperature-dependent function;

second function generator means for generating a second feedwater temperature-dependent function;

first multiplication means connected to receive said first signal for multiplying said first signal for multiplying said first signal by said first function and producing a third signal indicative of the product;

second multiplication means connected receive said second signal for multiplying said second signal by said second function and producing a fourth signal indicative of the product; and adding means for producing a weighted linear combination of said first and second signals by adding said third and fourth signals.

16. The subsystem according to claim 15, wherein said first function generator means comprises:

means for setting an upper temperature limit for the feedwater contained in said feedwater lines;

means for monitoring an instantaneous temperature of the feedwater in said feedwater lines;

means for setting a lower temperature limit for the feedwater contained in said feedwater lines;

first substracting means for periodically determining the difference between said upper temperature limit and said instantaneous temperature; and dividing means receiving said upper and lower temperature limits and the difference determined by said subtracting means for producing said first function by determining the ratio between said fifference and a differential temperature range defined by said upper and lower temperature limits.

17. The subsystem according to claim 16, wherein said second function generator means comprises:

second subtracting means for periodically determining the difference between said instantaneous temperature and said lower temperature limit; and dividing means receiving the differences determined by said first and second subtracting means for producing said second function by determining a ratio therebetween.

* * * * *